Patented Apr. 4, 1939

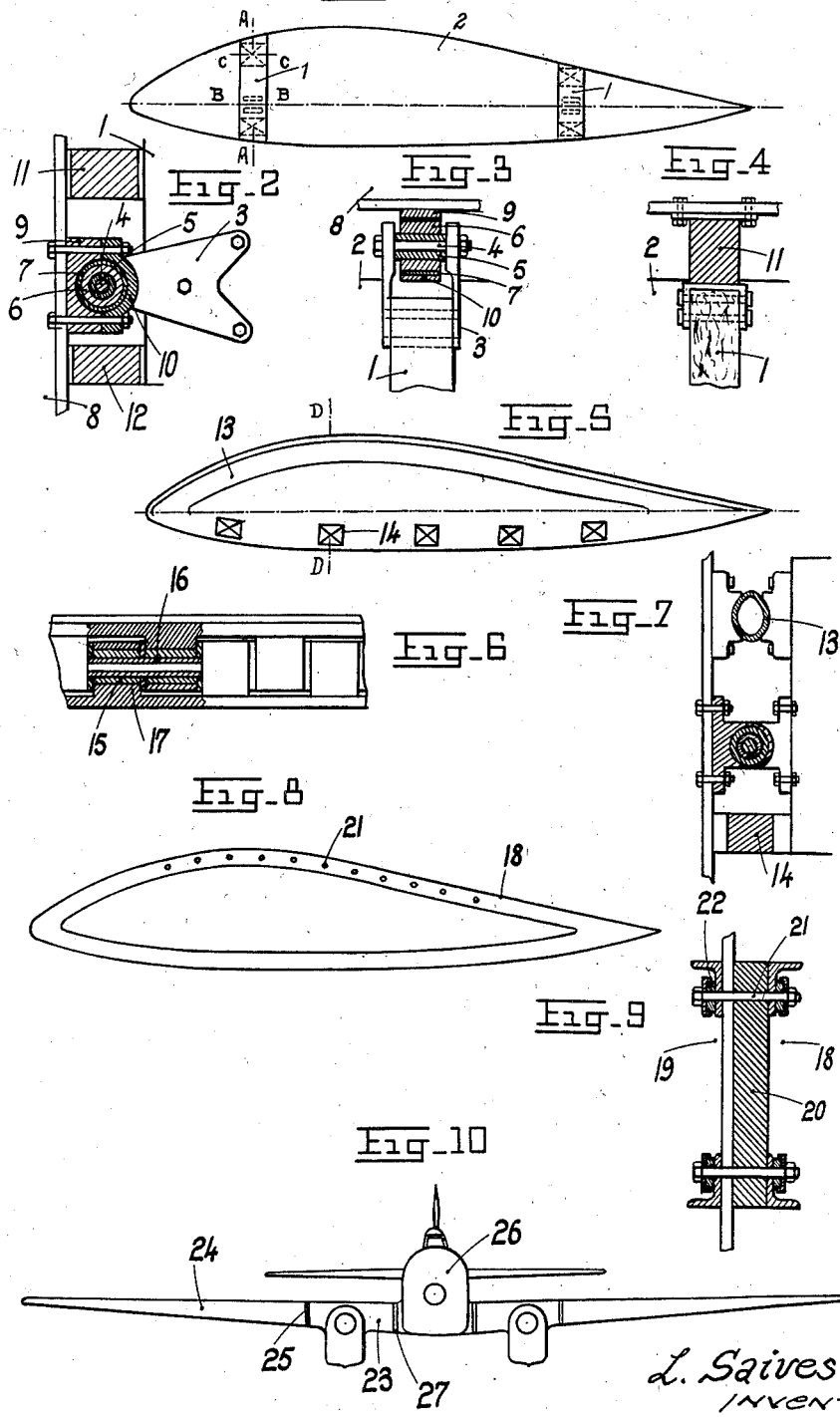

2,153,099

UNITED STATES PATENT OFFICE 2,153,099

ELASTIC WING ASSEMBLAGE

Léon Saives, Billancourt, France, assignor to Louis Renault, Billancourt, France Application June 10, 1936, Serial No. 84,567
In France February 14, 1936

5 Claims. (Cl. 244—123)

The present invention relates to an elastic assemblage for the various parts of an aeroplane, and chiefly for the connection between the wings and the fuselage, or between the different parts of the wings. Such an elastic connection, in which rubber blocks are preferably employed, has the advantage of reducing the stresses supported by the different members of the aeroplane during flight, and also of preventing the propagation of vibrations and hence the production of dangerous resonances. This elastic connection may be assured, in conformity to the invention, by a flexible joint consisting of journals which are mounted in rubber blocks and are combined with elastic stops adapted to limit the relative oscillation of the jointed parts, or again, simply by rubber strips which are inserted between the parts to be connected together.

The accompanying drawing shows by way of example various embodiments of the invention.

Fig. 1 is a side view of an aeroplane wing with elastic connections, in conformity to the invention.

Figs. 2, 3 and 4 are sections respectively on the lines A—A, B—B and C—C of Fig. 1.

Fig. 5 is a side view of a wing construction according to another embodiment of the invention.

Fig. 6 shows the construction of the pivot axle of the said wing.

Fig. 7 is a section on the line D—D of Fig. 6.

Fig. 8 is a side view of a wing construction according to another embodiment.

Fig. 9 is a section corresponding to Fig. 8.

Fig. 10 shows the application of the invention to a multi-engined aeroplane, in which each wing portion carrying an engine is separated from the remainder of the aeroplane by an elastic connection which prevents the transmission of vibrations.

In the embodiment represented in Figs. 1 to 4, each spar 1 of the wing 2 is provided with fittings 3 adapted for the insertion of a shaft 4 which is rotatable in a tube 5. The tubes 5 are mounted in rubber blocks 6 which are maintained by tubes 7 secured to the fuselage 8 by bearings consisting of a base-plate 9 and a cap 10, said bearings 9—10 being bolted to the fuselage 8. Blocks of a harder rubber, 11 and 12, are mounted respectively above and below each of the aforesaid elastic joints. Thus the assemblage of each wing comprises two elastic joints and four rubber blocks 11—12. The common axis of the two joints has practically the direction of travel of the aeroplane.

A modification of the thickness of the blocks 11 and 12, or the interposition of filler pieces between these latter and the fuselage, permits to vary the dihedral of the wings, and thus to provide for the adjustment.

In the embodiment shown in Figs. 5, 6 and 7, the wing is connected to the fuselage, as before, by a joint and two elastic stops, but in this case the upper stop consists of rubber air tube 13, which may extend from the front to the rear of the outline of the wing, and the said air tube may be connected to a source of air under pressure. It is supposed in the drawing that the lower stop consists of a solid rubber block 14, but it is evident that the pneumatic stop might be located at the lower part, or that both stops might consist of air tubes. Furthermore, in the embodiment herein represented, the joint between the wing and the fuselage consists of a hinge having a great number of elastic members, resembling a door hinge, but each member consists, as in the case of Figs. 1 to 4, of a rubber sleeve 15 mounted between a central tube 16 and an outer member 17 which forms part of one of the two devices to be joined by an elastic connection.

In the embodiment represented in Figs. 8 and 9, the elastic connection between the wing 18 and the fuselage 19 is effected by a single sheet of rubber 20 of great thickness, and the two devices are secured together by bolts 21 which act through the medium of elastic washers 22.

In the embodiment shown in Fig. 10, which is applicable to a two-engined aeroplane, each wing portion 23 carrying an engine is separated from the rest of the wing 24 by an elastic connection 25, and from the fuselage 26 by a second elastic connection 27, and thus the vibrations of the engines cannot be transmitted to the wings nor to the central fuselage, and this, in addition to the advantages already mentioned, will afford a great improvement in the comfort of the passengers.

I claim:

1. An elastic assemblage for the mounting of a wing to an adjacent portion of an aircraft, including upper and lower resilient spacing members positioned near the upper and lower surfaces of the wing and between the wing and the adjacent portion of an aircraft, and resilient connecting devices between the wing and the adjacent portion of an aircraft and also positioned substantially intermediate the upper and lower spacing members.

2. An elastic assemblage as claimed in claim 1, in which the spacing members are in the form of solid resilient blocks.

3. An elastic assemblage as claimed in claim 1, in which at least one of the spacing members is in the form of a pneumatic tube.

4. An elastic assemblage for the connecting together of the parts of a wing structure and for the mounting of the wing structure to the adjacent part of an aircraft, including upper and lower resilient spacing members positioned between the parts to be connected and positioned near the upper and lower surfaces of the wing, and resilient pivotal connecting devices between the parts to be connected and also positioned substantially intermediate the upper and lower spacing members.

5. An elastic assemblage as claimed in claim 4, in which the spacing members are in the form of rubber blocks and in which the resilient connecting devices each include a central shaft and at least one rubber sleeve arranged thereabout.

LÉON SAIVES.